Nov. 26, 1968   E. J. HUNTLEY   3,412,633
INDEXING MECHANISM

Filed Jan. 12, 1966   5 Sheets-Sheet 1

United States Patent Office 3,412,633
Patented Nov. 26, 1968

3,412,633
INDEXING MECHANISM
Eric John Huntley, Malvern Link, England, assignor to James Archdale and Company Limited, Blackpole, Worcester, England
Filed Jan. 12, 1966, Ser. No. 520,194
Claims priority, application Great Britain, Jan. 13, 1965, 1,482/65
3 Claims. (Cl. 74—821)

ABSTRACT OF THE DISCLOSURE

An indexing mechanism incorporates a variable speed drive for propelling an indexing table, a control element forming part of control means for said variable speed drive means, a rotatable cam which controls the acceleration and deceleration of the indexing table over the greater part of its movement by displacing said control element, and a lever engageable by stops on the indexing table to override the cam means in controlling the displacement of the control element to bring the table accurately to rest at a desired position.

This invention relates to an indexing mechanism and has as an object to provide such a mechanism in a convenient form.

Indexing mechanism in accordance with the invention comprises variable speed drive means for propelling a movable member towards a desired position, a control element the displacement of which from a datum position determines the velocity at which said movable member is propelled by the drive means, cam means for controlling the displacement of said control element whilst the movable member is approaching its desired position and means responsive to the position of said movable member and adapted to override the cam means to control the displacement of said control element whilst the movable member is at or adjacent said desired position.

Figure 1:
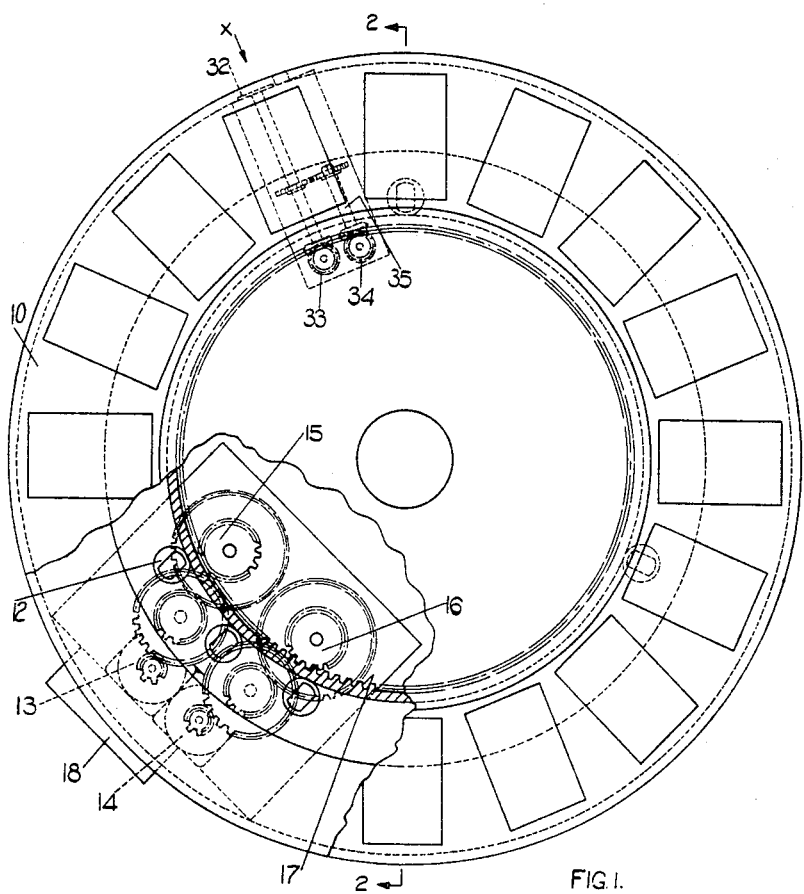
Figure 2:
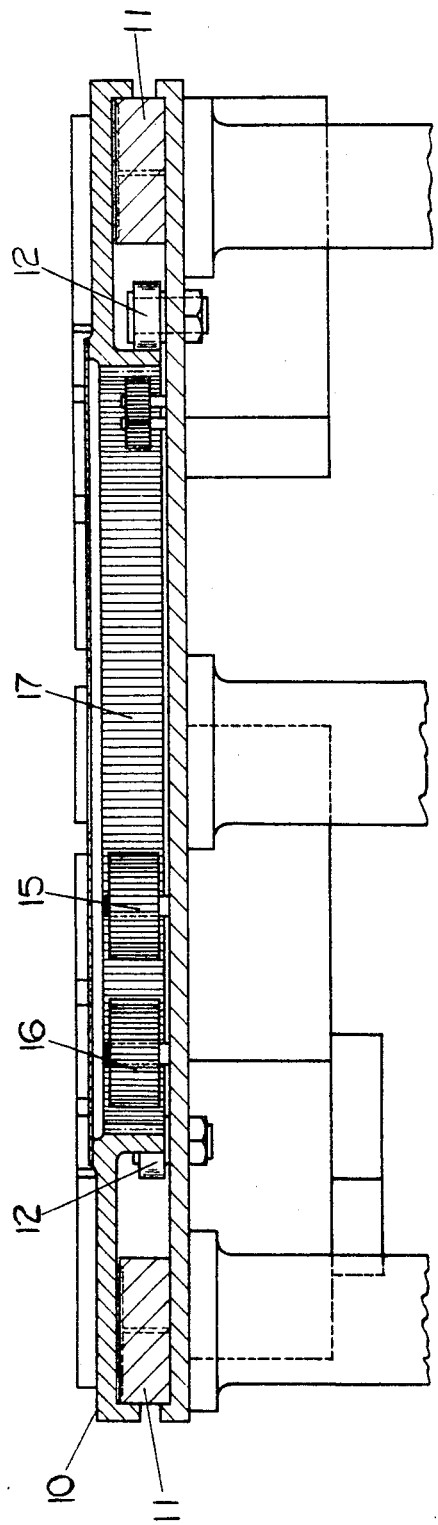
Figure 3:
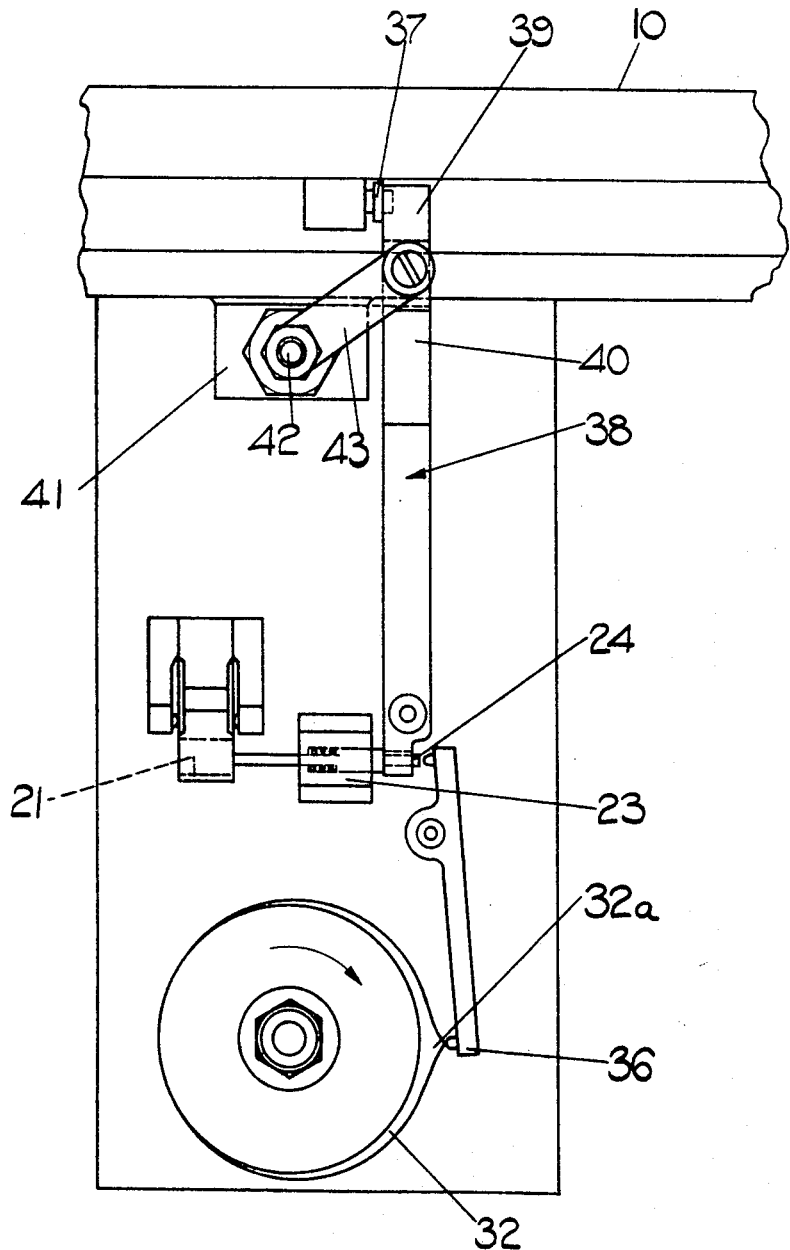
Figure 4:
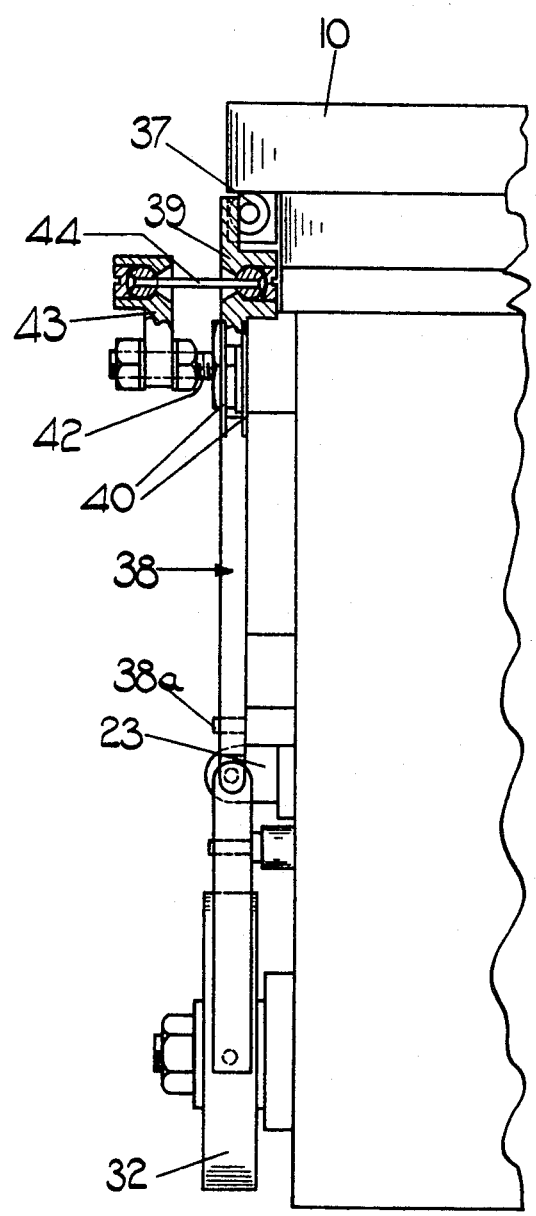
Figure 5:
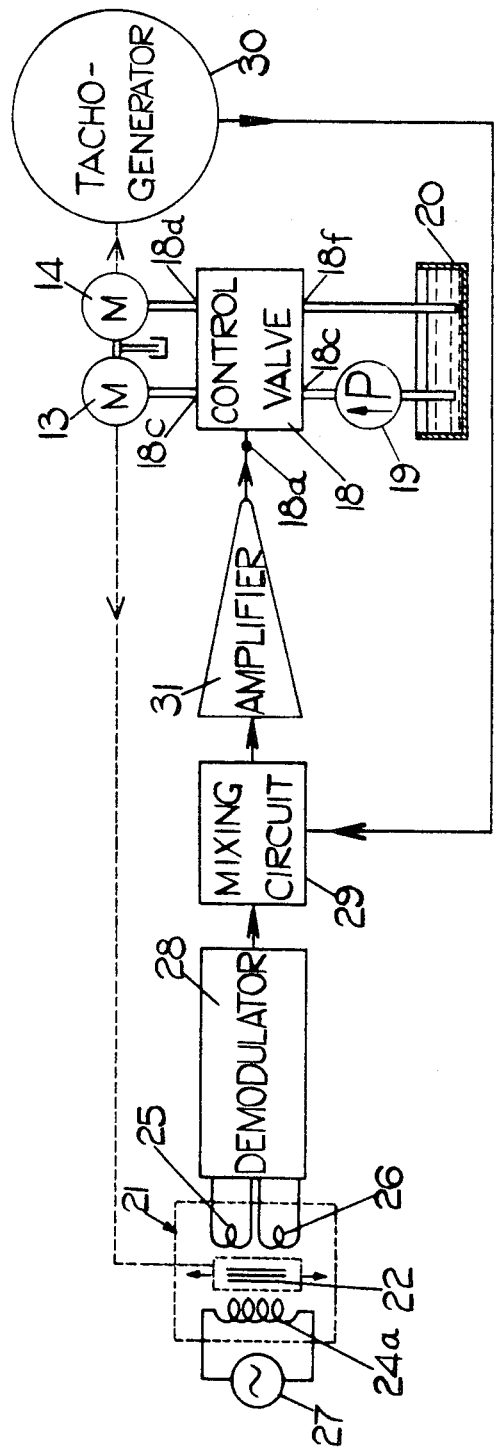

Reference will now be made to the accompanying drawings in which:

FIGURE 1 is a plan view of a rotary indexing table to which an example of the invention is applied, FIGURE 2 is a section taken on the line 2—2 in FIGURE 1, FIGURE 3 is an enlarged fragmentary view in the direction of arrow X in FIGURE 1, FIGURE 4 is a fragmentary side view of what is shown in FIGURE 3, and FIGURE 5 is a diagram illustrating the control system used in the arrangement shown.

In the example shown mechanism is provided for indexing the rotary table 10 of a machine tool, which is supported by hydrostatic thrust bearings 11 and roller journal bearings 12. The table is driven by means of drive means in the form of continuously variable-speed electro-hydraulic unit which drives the table through suitable gearing.

As shown in the drawings the electro-hydraulic unit includes a pair of hydraulic motors 13, 14 which are drivingly connected to the table by independent gear trains ending in final gears 15 and 16 respectively which are both engaged with a ring gear 17 under the table 10. The controlled ports 18c, 18d of an electro-hydro servo control valve 18 are connected to opposite ports of the motors 13, 14, the remaining ports of which are connected to drain. This valve is of known construction and is such that when there is no electrical input signal at its input terminal 18a, the pressures at each of the controlled ports 18c, 18d are equal and approximately midway between the pressures at the high and low pressure supply ports 18e, 18f of the valve. The port 18e is continuously supplied with pressurized liquid by a pump 19 and liquid from port 18f is returned to a reservoir 20.

The valve is also such that an input signal of one polarity at terminal 18a will cause the pressure at port 18c to fall and that at port 18d to rise. Conversely a signal of opposite polarity will cause the pressure at port 18c to fall and that of port 18d to rise. The motors and gearing are so arranged that a rising pressure at port 18c will cause the table 10 to be driven in the forward direction. The two motor arrangement ensures smooth acceleration and deceleration of the table without backlash.

The speed at which the table 10 is driven by the drive means is controlled by a linear differential transformer 21 having a control element in the form of a core 22 which is mounted for rectilinear sliding movements. The core 22 is spring-loaded by a device 23 and has a rod 24 projecting from it in the direction in which it is urged.

The transformer 21 comprises an input winding 24a and a pair of output windings 25, 26. The winding 24a is connected to a high frequency oscillator 27 and the windings 25, 26 supply inputs to a known form of demodulator 28 which produces a D.C. signal at an output terminal 28a. This D.C. signal is directly proportional to the displacement of the core 22 from a datum position. The signal is fed to a mixing circuit 29 which also receives a signal of opposite polarity from a tacho-generator 30 with a linear characteristic driven by one of the motors, 13, 14. The output signal from the mixing circuit is proportional to the algebraic sum of quantities proportional to the signals derived from the demodulator 28 and the tacho-generator 30 respectively. This output signal is amplified by an amplifier 31 the output signal from which is fed to the input terminal 18a of the valve 18.

It will be seen that when the table 10 is at rest and the core 22 occupies its datum position there will be no signal from the demodulator 28 or from the tacho-generator 30. Thus there will be no signal supplied to the control valve 18 and equal forward and reverse torques will be applied to the table 10 by the two motors and the table will remain at rest. If the core 22 is now displaced in the direction of its spring loading a signal will be produced by the demodulator and will cause a signal to be fed to the control valve to initiate forward acceleration of the table 10. For each position of the core 22 there is a corresponding steady speed of the table 10. If the actual speed is lower than the demanded speed the signal from the tacho-generator will be reduced and an increase in speed will result. Conversely if the actual speed is too high the table will be slowed down.

For controlling the displacement of the core 22 a rotatable cam 32 is provided. This cam is conveniently driven by the table through suitable reduction gearing. Thus if, for example, it is required that the table should be arrested at sixteen equally spaced positions in each revolution, the cam will be rotated at sixteen times the speed of the table.

In the example shown the cam 32 is driven via two independent gear trains picking up from gears 33, 34 engaging the ring gear 17. A torque shaft 35 is used in one gear train to eliminate backlash. The cam 32 actually engages a pivoted follower 36 in the form of a first order lever, the opposite end of which engages directly on the rod 24. As the follower 36 is displaced by movement of the cam such that the radius of its operative portion is increasing, the rod 24 is moved against the spring loading and hence causes decreasing forward velocity. The cam/follower/rod arrangement is such that the core 22 cannot be moved past its datum position to demand reverse rotation of the table. Moreover the cam is preferably shaped, taking its own motion into account, to demand a cycloidal variation in the velocity of the table 10 as it moves through one sixteenth of a revolution. When the table occupies any one of its arrested positions the cam 32 is arranged so that its lobe 32a is presented to the follower 36. In the position shown in FIGURE 3 the table is at rest in one of its arrested positions with the core held in its datum position by an overriding positioning control. There is, as shown, a small clearance in this position between the follower 36 and the rod 24.

The overriding control is employed to control the displacement of the core 22 when the table 10 is in the vicinity of any one of its desired positions. This control is provided by sixteen projections 37 equally spaced around the periphery of the table 10 and a lever 38 (pivoted at 38a) one end of which can be engaged by the projections 37 and the other end of which can engage a shoulder on the rod 24. Except when the table 10 is closely adjacent to one of its desired positions the lever 38 can be freely moved by the rod 24. As the table approaches one of these positions, however, the lever 38 is engaged by the appropriate projection 37 and removes the rod 24 from the control of the cam 32. The lever 38 now provides a feed-back into the control arrangement and adjusts the position of the core 22 until the table 10 comes to rest in the desired position.

It will now be appreciated that when the table 10 is at rest in a desired position it cannot be restarted until the controlling influence of the lever 38 has been removed. This may be accomplished by having the lever 38 or the part of the lever 38 engageable with the projections displaceable laterally to clear the projection. In the arrangement shown the lever 38 has an end part 39 engageable by the stop 37 and supported by parallel leaf springs 40 on the body of the lever 38. The part 39 can be displaced by a pneumatic piston and cylinder unit 41, the piston rod 42 of which carries an arm 43. The arm 43 is coupled to the part 39 by a link 44 provided at both ends with ball joints.

The cycle of operation is thus as follows:

The lever 38 is first freed to permit the core 22 to move out of its datum position into engagement with the lobe 32a of the cam. The acceleration and deceleration of the table are then controlled by the cam 32 until the table is near to its next position. The lever 38 is then engaged by the appropriate projection 37 and overrides the cam control to bring the table 10 accurately to rest.

The above described example may be modified by the substitution of a purely hydraulic drive. In this case the control element will be the stem of a suitable four-way valve.

The invention may also be applied to linear indexing mechanisms or to the feeding of members or articles along any predetermined path.

Furthermore the cam 38 may, if desired, be driven by any suitable constant speed drive instead of by the table, the shape of the cam being suitably modified to provide the desired velocity/time relationship.

I claim:

1. In combination, an indexing table, a plurality of stops on said indexing table defining a plurality of indexed positions respectively, variable speed drive means for said table and control means for said variable speed drive means, said control means comprising a rotary cam, means driving said rotary cam in synchronism with said table, a control element displaceable by said cam from a datum position, said control element being operatively related to said control means so that the speed at which said table is driven by said variable speed drive means increases as the control element is displaced out of its datum position, and lever means engageable by said stops on the table and with said control element to override the effect of the cam on the control element, so as to bring the table to rest at its indexed position.

2. The combination claimed in claim 1 in which the cam always displaces the control element from its datum position, the control element being movable to its datum position only by said lever when the table is at any one of its indexed positions.

3. The combination claimed in claim 2 in which said lever comprises a pivotally mounted portion engageable at one end with said control element and an end portion on the opposite end of the lever engageable with the stops and coupled to said first mentioned portion, so as to be laterally displaceable relative thereto for releasing the lever from a stop with which it is engaged, whereupon the control element is re-engaged with the cam for restarting the variable speed drive means.

References Cited

UNITED STATES PATENTS

| 1,942,927 | 1/1934 | Johnson et al. | 74—821 |
| 2,366,398 | 1/1945 | Harrington | 74—821 |
| 2,876,660 | 3/1959 | Malick | 74—821 |
| 3,072,836 | 1/1963 | Eisengrein | 74—821 X |

FOREIGN PATENTS

| 741,463 | 12/1955 | Great Britain. |
| 810,295 | 3/1959 | Great Britain. |

FRED C. MATTERN, JR., *Primary Examiner.*

F. D. SHOEMAKER, *Assistant Examiner.*